United States Patent
Gud et al.

(10) Patent No.: US 10,564,850 B1
(45) Date of Patent: Feb. 18, 2020

(54) MANAGING KNOWN DATA PATTERNS FOR DEDUPLICATION

(71) Applicant: Tintri by DDN, Inc., Santa Clara, CA (US)

(72) Inventors: Amit Gud, San Jose, CA (US); Karthikeyan Srinivasan, Fremont, CA (US); Shobhit Dayal, San Francisco, CA (US)

(73) Assignee: Tintri by DDN, Inc., Santa Clara, CA (US)

(*) Notice: Subject to any disclaimer, the term of this patent is extended or adjusted under 35 U.S.C. 154(b) by 46 days.

(21) Appl. No.: 15/834,421

(22) Filed: Dec. 7, 2017

Related U.S. Application Data

(60) Provisional application No. 62/465,029, filed on Feb. 28, 2017.

(51) Int. Cl.
  *G06F 12/00* (2006.01)
  *G06F 3/06* (2006.01)
  *G06F 12/06* (2006.01)

(52) U.S. Cl.
  CPC .......... *G06F 3/0608* (2013.01); *G06F 3/0641* (2013.01); *G06F 3/0659* (2013.01); *G06F 3/0673* (2013.01); *G06F 12/06* (2013.01); *G06F 2212/1044* (2013.01)

(58) Field of Classification Search
  CPC ...... G06F 3/0608; G06F 3/0659; G06F 12/06; G06F 3/0641; G06F 3/0673; G06F 2212/1044
  USPC ........................................................ 711/154
  See application file for complete search history.

(56) References Cited

U.S. PATENT DOCUMENTS

| | | | |
|---|---|---|---|
| 9,529,808 B1 * | 12/2016 | Sudarsanam | G06F 11/1464 |
| 2008/0098018 A1 * | 4/2008 | King | G06F 16/9027 |

\* cited by examiner

*Primary Examiner* — Mardochee Chery
(74) *Attorney, Agent, or Firm* — Van Pelt, Yi & James LLP

(57) ABSTRACT

Dynamic block optimization for space and performance is disclosed, including: determining that a data pattern associated with a data block included in a write request matches a promoted data pattern; and performing the write request by associating the data block with a previously stored copy of the data block without updating an associated reference count. Dynamic block optimization for space and performance further includes determining that a data pattern associated with a data block included in a write request matches a predetermined data pattern; and performing the write request by storing a static representation associated with the data block and not storing the data block, wherein the static representation is usable to generate the data block.

16 Claims, 17 Drawing Sheets

1100

| Known (Predetermined) Data Pattern 1 | First Type of Static Representation 1 |
|---|---|
| Known (Predetermined) Data Pattern 2 | First Type of Static Representation 2 |
| Known (Predetermined) Data Pattern 3 | First Type of Static Representation 3 |

...

| Known (Predetermined) Data Pattern M | First Type of Static Representation M |
|---|---|

| Known (Promoted) Data Pattern 1 | Second Type of Static Representation 1 |
|---|---|
| Known (Promoted) Data Pattern 2 | Second Type of Static Representation 2 |
| Known (Promoted) Data Pattern 3 | Second Type of Static Representation 3 |

...

| Known (Promoted) Data Pattern N | Second Type of Static Representation N |
|---|---|

| Static Representation 1 Associated with Promoted Data Pattern 1 | Augmented Block Metadata Record Index 1 |
| --- | --- |
| Static Representation 2 Associated with Promoted Data Pattern 2 | Augmented Block Metadata Record Index 2 |
| Static Representation 3 Associated with Promoted Data Pattern 3 | Augmented Block Metadata Record Index 3 |
| Static Representation 4 Associated with Promoted Data Pattern 4 | Augmented Block Metadata Record Index 4 |

. . .

| Static Representation N Associated with Promoted Data Pattern N | Augmented Block Metadata Record Index N |
| --- | --- |

FIG. 12

MANAGING KNOWN DATA PATTERNS FOR DEDUPLICATION

CROSS REFERENCE TO OTHER APPLICATIONS

This application claims priority to U.S. Provisional Patent Application No. 62/465,029 entitled DYNAMIC BLOCK OPTIMIZATION FOR SPACE AND PERFORMANCE filed Feb. 28, 2017 which is incorporated herein by reference for all purposes.

BACKGROUND OF THE INVENTION

Data deduplication is a commonly used space savings technique among enterprise data storage and consumer data storage alike. Deduplication works on the premise that data patterns getting written to the storage device repeat over time. Instead of redundantly storing data, a pointer to the existing data having the exact same pattern may be generated/stored and a reference count is maintained on the incoming references to the data pattern.

BRIEF DESCRIPTION OF THE DRAWINGS

Various embodiments of the invention are disclosed in the following detailed description and the accompanying drawings.

FIG. 11 is a diagram showing an example of a known data pattern data structure.

FIG. 12 is a diagram showing an example of an auxiliary data structure.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Data deduplication can improve space savings considerably and is one of the most efficient tools for backup workloads. However, data deduplication comes at a cost. Generally, a reference count is maintained for every block of data written out. If the same data block is seen again, the reference count of the already written data block is incremented instead of redundantly writing the same block to the storage system. This requires the lookup of the matching data block, loading the metadata associated with it, and obtaining appropriate locks before incrementing the reference count. A reference count may be maintained for a data block to determine, for example, whether the data block is no longer referenced by any files and therefore, can be deleted.

Figure 1:
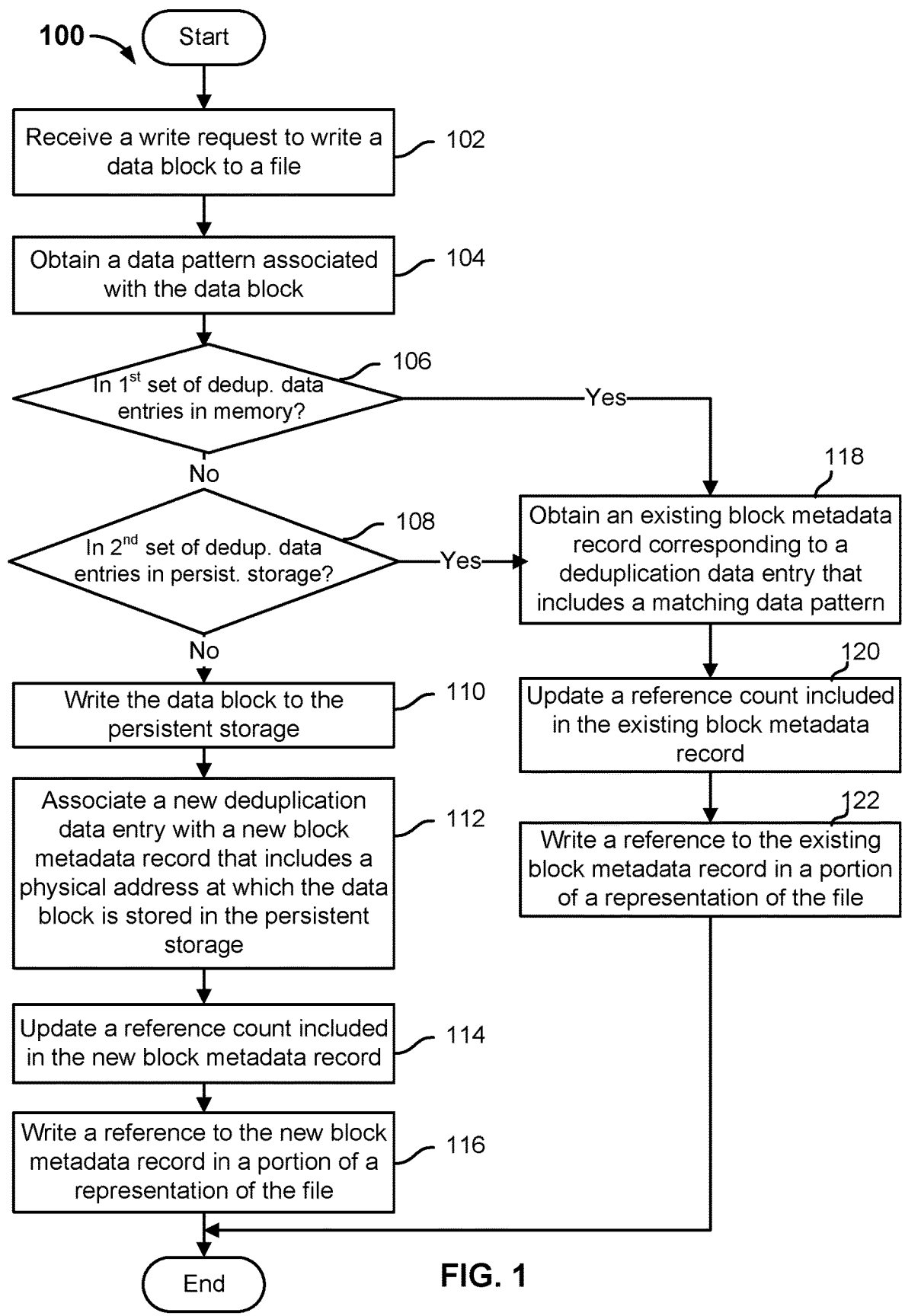
FIG. 1 is a flow diagram showing an example conventional process for performing a deduplication of a data block that is requested to be written.

FIG. 1 is a flow diagram showing an example conventional process for performing a deduplication of a data block that is requested to be written.

While process 100 is only one example process by which a data block that is requested to be written can be deduplicated against previously stored data blocks, process 100 highlights the conventional practice of maintaining a reference count for a data block that is stored at a physical storage based on the number of times that the data block has been written to one or more files (i.e., the number of times that the data block is "referenced" by one or more files). In various embodiments, a data pattern is sometimes referred to as a "fingerprint." A data pattern associated with the data block is a value that is derived from at least a portion of the data block and is used to identify copies of the data block. In various embodiments, a data pattern comprises less data than the data block that it represents. For example, a data pattern comprises a hash value (e.g., SHA1) that is generated using at least a portion of the data block.

At 102, a write request to write a data block to a file is received.

At 104, a data pattern associated with the data block is obtained. For example, the data pattern that is associated with the data block comprises an SHA1 of at least a portion of the data block.

At 106, it is determined whether the data pattern is found in a first set of deduplication data entries stored in memory. In the event that the data pattern is found in the first set of deduplication data entries stored in memory, control is transferred to 118. Otherwise, in the event that the data pattern is not found in the first set of deduplication data entries stored in memory, control is transferred to 108.

In at least some conventional deduplication processes, at least a portion of data patterns associated with data blocks that have already been stored in persistent storage is cached in memory for faster access, while the remainder of the data patterns associated with data blocks that have already been stored in persistent storage are themselves stored in persistent storage. Such data patterns are stored so that data blocks that are subsequently requested to be written may be deduplicated using these data patterns. For example, newer data patterns or more frequently requested data patterns are stored in memory while older data patterns or less frequently requested data patterns are stored in persistent storage. A deduplication data entry may be a data structure that stores a data pattern of a data block. The data pattern associated with the data block that is requested to be written is compared against each of the data patterns that are stored in the memory to determine whether a matching data pattern exists. If a matching data pattern is not found among the data patterns that are stored in memory, then the search continues to the remaining data patterns that are stored in persistent storage.

At 108, it is determined whether the data pattern is found in a second set of deduplication data entries stored in persistent storage. In the event that the data pattern is found in the second set of deduplication data entries stored in persistent storage, control is transferred to 118. Otherwise, in the event that the data pattern is not found in the first set of deduplication data entries stored in memory, control is transferred to 110.

At 110, the data block is written to the persistent storage. If the data pattern associated with the data block that is requested to be written does not match any of the data patterns that are stored in either memory or persistent storage, then it is determined that the data block associated with the write request has not been previously stored at the storage system. As such, the data block is written to the persistent storage (since a copy thereof is not already currently stored at the storage system).

At 112, a new deduplication data entry is associated with a new block metadata record that includes a physical address at which the data block is stored in the persistent storage. For example, a block metadata record may be a data structure that is used to track the physical address at which a data block is stored at the persistent storage and also the reference count associated with the number of portions of files that reference that data block. As such, the physical address at which a data block is stored at the persistent storage is stored in a new block metadata record that is used to track the data block. A new deduplication data entry that references the new block metadata record is stored in either memory or persistent storage.

An example block metadata record is described in FIG. 2, below.

At 114, a reference count included in the new block metadata record is updated. The reference count field in the new block metadata record is updated to indicate that there is one reference to the data block with which the new block metadata record is associated.

At 116, a reference to the new block metadata record is written in a portion of a representation of a file. A reference (e.g., pointer) to the new block metadata record is written to a portion (e.g., logical offset) of a representation of the file associated with the write request. For example, the file may be represented as a tree/hierarchical data structure (e.g., B+Tree) and each logical offset associated with the file is represented as a leaf node. As such, if the logical offset were read in response to a read request to that logical offset, the pointer to the new block metadata record would be used to locate the new block metadata record. The new block metadata record would then be used to identify the physical address at which the data block is stored to satisfy the read request.

An example representation of a file is described in FIG. 3, below.

At 118, an existing block metadata record corresponding to a deduplication data entry that includes a matching data pattern is obtained. If the data pattern associated with the data block that is requested to be written matches a data pattern that is stored in either memory or persistent storage, then it is determined that a copy of the data block associated with the write request is already stored at the storage system. An existing block metadata record that stores the physical address at which a data block is stored at the persistent storage is referenced by the deduplication data entry that stored the matching data pattern.

At 120, a reference count included in the existing block metadata record is updated. Because the data block is determined to have an additional reference to it, the reference count that is included in the existing block metadata record is incremented by one.

At 122, a reference to the existing block metadata record is written in a portion of a representation of the file. A reference (e.g., pointer) to the existing block metadata record is written to a portion (e.g., logical offset) of a representation of the file associated with the write request.

While process 100 describes processing a write request of a data block to a file, another request may request to delete a data block from a file. Deleting a data block from a file and thereby deleting the reference from the file to the data block includes decrementing the reference count associated with that data block/data pattern. As such, a reference count associated with a data pattern is subject to incrementing and decrementing, depending on the number of portions of files (e.g., logical offsets of files) that refer to the data block associated with the data pattern.

As shown in FIG. 1, conventionally, to handle a new write of a previously stored data block at a storage system involves updating a corresponding reference count of a block metadata record. However, updating the corresponding reference count of a block metadata record requires obtaining a lock associated with that block metadata record to ensure atomic updates to the block metadata. Furthermore, a separate write lock may need to be obtained to serialize other updates to the same logical offset of a file. The contention over the use of locks associated with the block metadata record and the logical offsets of a file in a conventional system may be very inefficient and computationally expensive.

Figure 2:
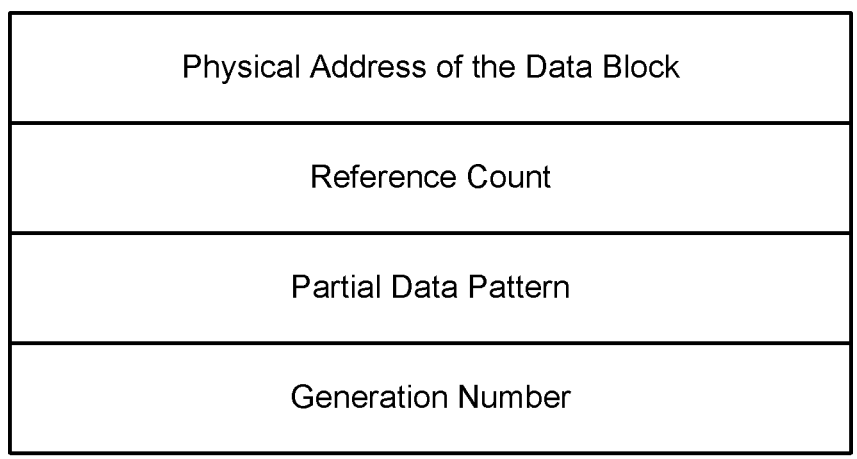
FIG. 2 is a diagram showing an example of a block metadata record.

FIG. 2 is a diagram showing an example of a block metadata record. Block metadata record 200 includes fields such as "Physical Address of the Data Block," "Reference Count," "Partial Data Pattern," and "Generation Number." The "Physical Address of the Data Block" field may store a value that represents the physical address of the location at which a data block is stored at the underlying storage. The "Reference Count" field may store a value that represents the number of files or locations within files that reference (e.g., point to) the physical address of the location at which the data block is stored at the underlying storage by storing references (e.g., pointers) to block metadata record 200, which stores the physical address of the location at which that data block is stored at the underlying storage. The "Reference Count" is incremented when a new portion of a file references the block metadata record and the "Reference Count" is decremented when a portion of a file removes its reference to the block metadata record. One advantage of using the block metadata record as an indirect reference to the physical address of the location at which a data block is stored is that the block metadata record may store additional information for that data block such as the reference count. When the reference count decrements to a predetermined value (e.g., zero), it can be determined that the data block can be safely reclaimed/deleted off the underlying storage because there are no longer files that reference that data block. The "Partial Data Pattern" field may store a portion of the data pattern of the data block. The "Generation Number" field may store the current generation of the block metadata record as the same block metadata record may be reused for different data blocks.

When a data block is written, a block metadata record is allocated and assigned to this block. The block metadata will be associated with this data block until it gets overwritten or deleted. After a data block is overwritten or deleted, this block metadata record is freed and goes back to the pool. Now when a new data block is written, this block metadata record may be assigned to store information about the new data block and the block metadata record's generation number is incremented (e.g., by 1). The above example illustrates how a block metadata can get re-assigned or re-purposed for a different data block after the previous data block becomes invalid due to deletion or overwrite.

Figure 3:
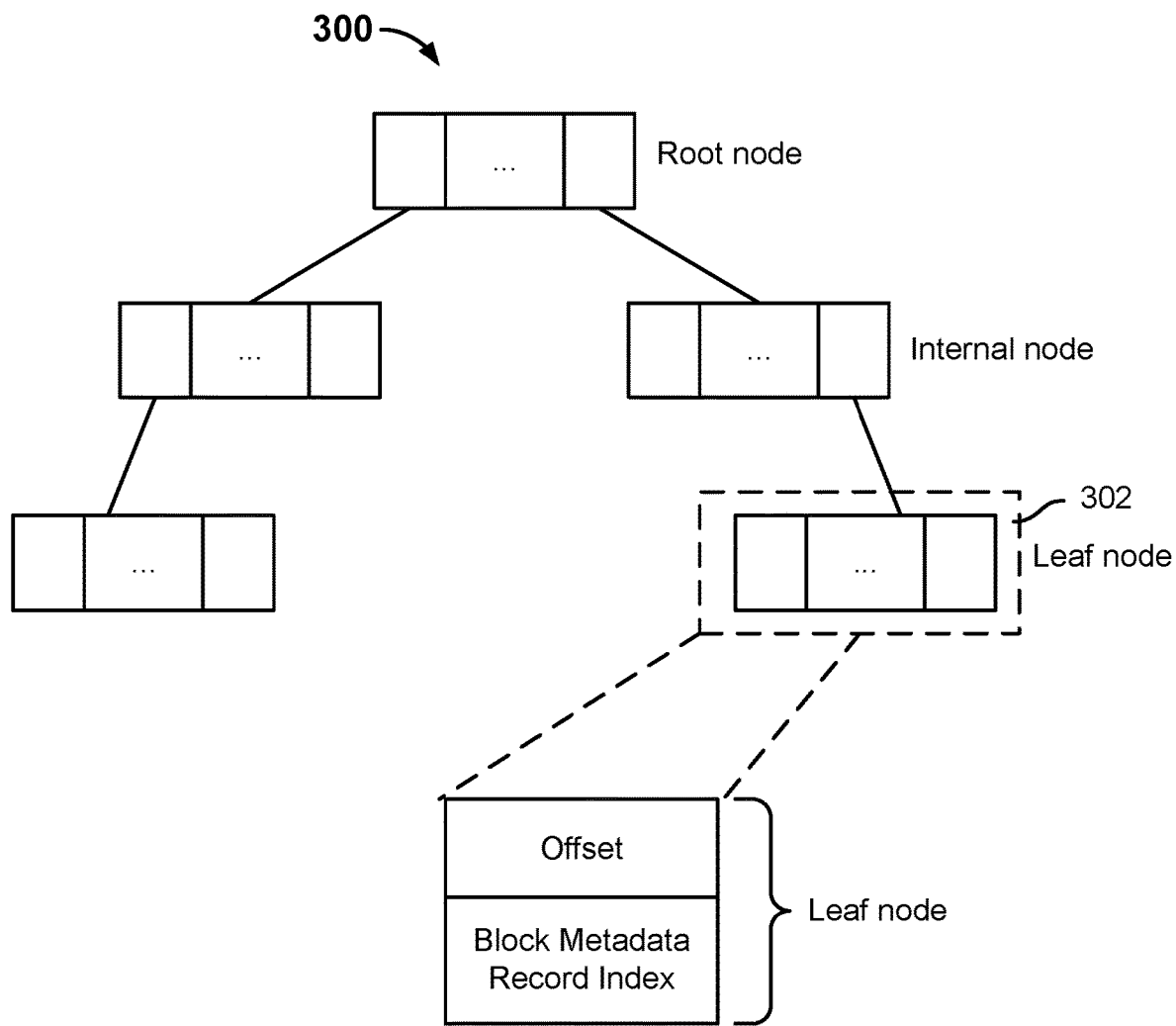
FIG. 3 is a diagram showing an example representation of a file.

FIG. 3 is a diagram showing an example representation of a file. In the example of FIG. 3, file 300 is represented as a hierarchy/tree (e.g., a B+tree) of nodes. The top node of the hierarchy is referred to as the "root node" and the nodes at the bottom of the hierarchy are referred to as "leaf nodes." Intermediate nodes in between the root node and the leaf nodes are referred to as "internal nodes." Each leaf node, such as leaf node 302, comprises at least a logical "offset" field associated with the file and a "block metadata record index" field. The "block metadata record index" field may store a reference (e.g., pointer) to a block metadata record, such as the example block metadata record shown in FIG. 2, which stores the physical address at which a data block associated with the logical "offset" of the file is stored at the underlying storage. If the value of the "Reference Count" field in the block metadata record is one, then it implies that just one leaf node included in a file references to that block metadata record and the physical data block with which that block metadata record is associated. However, if the value of the "Reference Count" field in the block metadata record is greater than one, then it implies that more than one leaf node included in one or more files reference that block metadata record and the physical data block with which that block metadata record is associated.

As mentioned above, by maintaining and updating a reference count associated with references to a stored data block in underlying storage, computing resources are needed to obtain/manage a first lock to update a block metadata record, including the reference count field thereof, that stores the physical address of the stored data block in persistent storage. Computing resources are also needed to obtain/manage a second lock to update a logical offset in a tree representation of a file (e.g., in order to update the block metadata record to which the logical offset references). Generally, there is much greater contention to obtain the first lock to update the reference count field of a block metadata record as compared to the contention associated with obtaining the second lock to update a logical offset in a representation of a file, as the latter only occurs if there is an overwrite request. Furthermore, if there are multiple processes that are trying to obtain one or both of such locks, then additional computing resources are needed to resolve conflicts associated with lock contention.

Embodiments of managing known data patterns for deduplication are described herein. In various embodiments, a "known data pattern" comprises a data pattern of a data block that is identified to be commonly written. In various embodiments, a known data pattern includes a "predetermined data pattern" and/or a "promoted data pattern." In various embodiments, a "predetermined data pattern" comprises a user submitted data pattern. In various embodiments, a "promoted data pattern" comprises a data pattern that meets a popularity criterion (e.g., the data pattern is determined to have a reference count of at least a threshold value). In various embodiments, a data pattern of a data block that is requested to be written to a file in a storage system is first compared to known data patterns to determine whether there is a match. In various embodiments, if the data pattern of the data block that is requested to be written to the file matches a known data pattern, then a static representation associated with the matching known data pattern is written to a representation of the file, the data block is not stored (again) at the storage system, and a reference count associated with the data pattern is not updated/maintained. In the event that the matching known data pattern is a predetermined data pattern, then the static representation associated with the matching predetermined data pattern comprises data that is usable to generate/reconstruct the data block. In the event that the matching known data pattern is a promoted data pattern, then the static representation associated with the matching promoted data pattern comprises data that is usable to locate a previously stored copy of the data block at the storage system.

Figure 4:
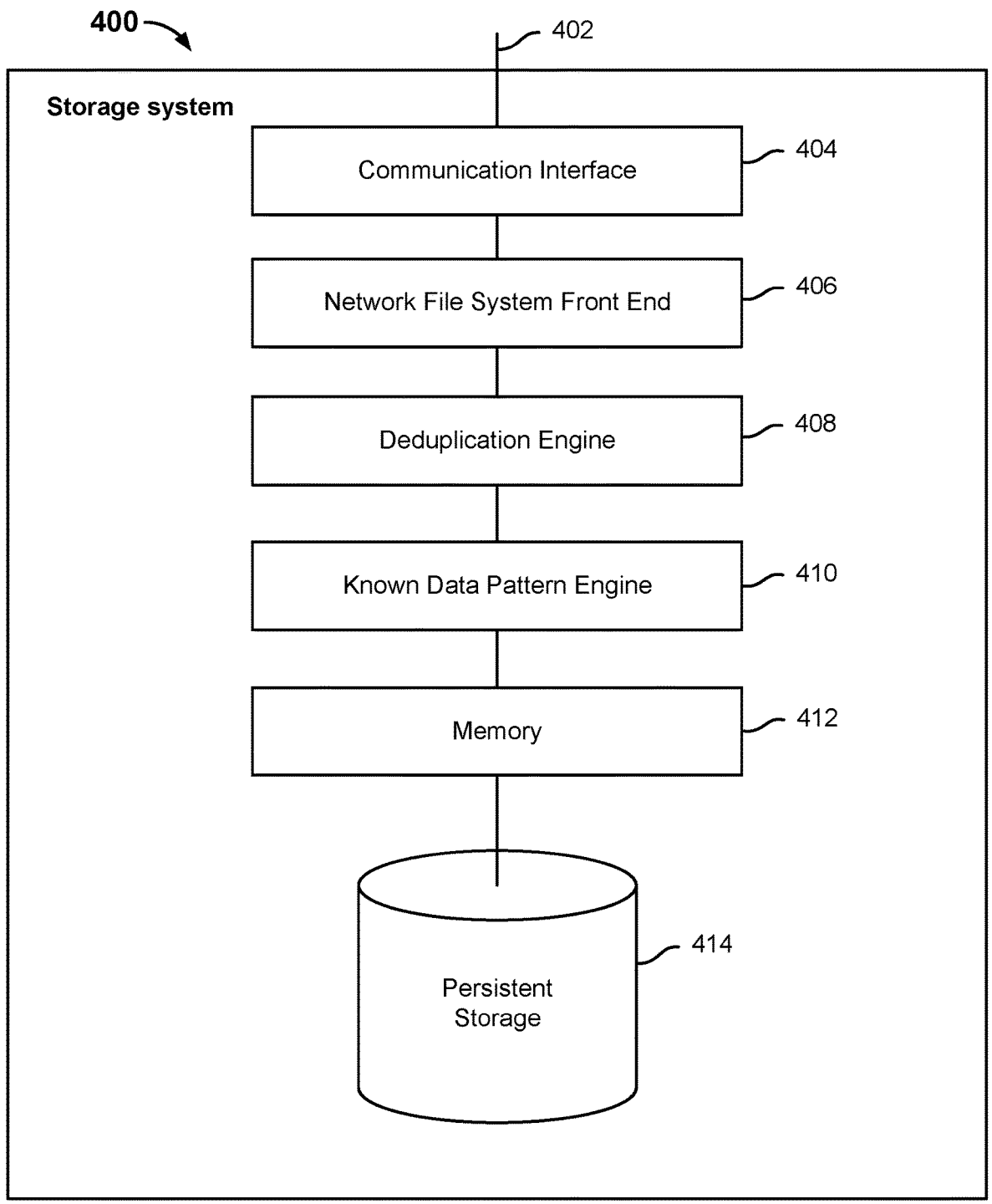
FIG. 4 is a diagram showing a system for managing known data patterns for deduplication.

FIG. 4 is a diagram showing a system for managing known data patterns for deduplication. In the example shown, storage system 400 includes a network connection 402 and a communication interface 404, such as a network interface card or other interface, which enable the storage system to be connected to and communicate via a network. The storage system 400 further includes network file system front end 406 configured to handle NFS requests from applications and/or virtual machines running on one or more servers.

Deduplication engine 408 is configured to store, for deduplication purposes, data patterns of new data blocks that are stored at the storage system. In some embodiments, deduplication engine 408 is configured to perform at least a portion of a conventional deduplication process such as process 100 of FIG. 1, above. In various embodiments, deduplication engine 408 is configured to store/cache at least some of the data patterns in memory 412 and the remaining data patterns in persistent storage 414. For example, persistent storage 414 comprises solid state drive (SSD), hard disk drive (HDD), and/or a combination of SSD and HDD. In response to a request to write a data block, deduplication engine 408 is configured to determine the data pattern associated with the data block and first compare the data pattern to the data patterns included in the deduplication data entries stored in memory 412. If no deduplication data entry with a matching data pattern is found in memory 412, then deduplication engine 408 is configured to compare the data pattern to the data patterns included in the deduplication data entries stored in persistent storage 414.

If no deduplication data entry with a matching data pattern is found in persistent storage 414 either, then deduplication engine 408 is configured to determine that the data pattern is associated with a data block for which a duplicate/previous copy is not already stored at the storage system and will also store the data block at persistent storage 414. Deduplication engine 408 is then configured to associate the physical address at which the data block is stored in persistent storage 414 with a new deduplication data entry that includes the data pattern and also maintain a reference count associated with the data block/data pattern. In some embodiments, deduplication engine 408 is configured to store the physical address at which the data block is stored in persistent storage 414 and the reference count in a block metadata record and then store a reference to that block metadata record in the new deduplication data entry, which itself may be stored in memory 412 or persistent storage 414, depending on the caching policies that are employed by deduplication engine 408. Deduplication engine 408 is configured to write a reference to the block metadata record to an appropriate logical offset/portion of the file specified by the write request.

If a deduplication data entry with a matching data pattern is found in either memory 412 or persistent storage 414, then deduplication engine 408 is configured to determine that the data pattern is associated with a data block for which a duplicate/previous copy is already stored at the storage system. Deduplication engine 408 is configured to update the block metadata record that is referenced by the deduplication data entry with the matching data pattern, including by incrementing the reference count associated with the data block/data pattern. Deduplication engine 408 is configured to write a reference to the block metadata record to an appropriate logical offset/portion of the file specified by the write request.

Known data pattern engine 410 is configured to manage and use a set of known data patterns that are stored in a known data pattern data structure. In some embodiments, the known data pattern data structure is an in-memory buffer (e.g., a ring buffer). In some embodiments, the buffer can be lossy to save on memory with the assumption that if the data block is popular, it will show up again. In some embodiments, the contents of the known data pattern data structure get dumped to a file periodically. In some embodiments, the known data pattern data structure is stored in memory 412 so that they can be accessed faster (than they would be had they been stored in persistent storage 414). In some embodiments, the known data pattern data structure is stored in persistent storage 414 so that they can be recovered after the storage system crashes. In some embodiments, at least a portion of the known data pattern data structure is cached in memory 412, while the remainder or the entirety of the known data pattern data structure is also stored in persistent storage 414. In various embodiments, the known data patterns of the known data pattern data structure are stored separately from the deduplication data entries that are maintained by deduplication engine 408.

Known data pattern engine 410 is configured to store predetermined data patterns and also promoted data patterns. In various embodiments, a predetermined data pattern comprises a data pattern that is associated with a data block that is reconstructable from a more lightweight data (e.g., a set of encoded data). For example, a predetermined data pattern is associated with a data block that is a series of ones or zeroes. In some embodiments, a predetermined data pattern is submitted by a user. In various embodiments, a promoted data pattern comprises a data pattern that is associated with a data block that is not reconstructable from a more lightweight value. Instead, in various embodiments, a promoted data pattern comprises a data block for which a maintained reference count meets or exceeds a predetermined promotion threshold value. Known data pattern engine 410 is configured to identify a data pattern, which is stored by deduplication engine 408 in a deduplication data entry in either memory 412 or persistent storage 414, for which the maintained reference count meets or exceeds a predetermined promotion threshold value (e.g., 25,000) as being a promoted data pattern. To improve the efficiency with which data blocks are deduplicated against the known data patterns, known data pattern engine 410 does not update (i.e., no longer updates) a reference count associated with any known data pattern stored in the known data pattern data structure.

In response to a request to write a data block to a file in the storage system, in various embodiments, known data pattern engine 410 is configured to determine a data pattern associated with the data block and compare that data pattern with the known data patterns stored in the known data pattern data structure. If a matching known data pattern is found, known data pattern engine 410 is configured to store a static representation (which is sometimes referred to as a "static pointer") corresponding to the known data pattern to an appropriate logical offset/portion in a representation (e.g., B+tree) of the file. In various embodiments, the type of static representation that is written to the appropriate logical offset/portion in a representation of the file may vary depending on whether the matching known pattern is a predetermined data pattern or a promoted data pattern. In various embodiments, if the matching known pattern is a predetermined data pattern, then the type of static representation that is written to the appropriate logical offset/portion in a representation of the file is a lightweight data (e.g., a set of encoded data) that is usable to reconstruct the data block (e.g., in response to a read request to that logical offset/portion of the file). As such, in various embodiments, a data block associated with a predetermined data pattern is not stored at the storage system because it can be easily reconstructed. In various embodiments, if the matching known pattern is a promoted data pattern, then the type of static representation that is written to the appropriate logical offset/portion in a representation of the file is a reference (e.g., pointer) to an entry in an auxiliary data structure (e.g., table). In various embodiments, the auxiliary data structure is stored in persistent storage 414 so that the auxiliary data structure may be recovered in the event of a system crash. Each entry in the auxiliary table corresponds to a physical address in persistent storage 414 at which the data block associated with the promoted data pattern is stored. In various embodiments, the auxiliary table is stored in persistent storage 414. Regardless of whether the matching known data pattern is a predetermined data pattern or a promoted data pattern, writing the static representation associated with the matching known data pattern to the representation of the requested file does not involve the updating of a reference count associated with the data block associated with the matching known data pattern.

However, if no matching known data pattern is found for a data pattern that is associated with a data block that is requested to be written, known data pattern engine 410 is configured to send an indication to deduplication engine 408 to compare the data pattern to the deduplication data entries that it maintains in memory 412 and/or persistent storage 414, as described above.

In response to a request to read a data block from a file in the storage system, in various embodiments, known data pattern engine 410 is configured to read the contents that are stored at the portion/logical offset/leaf node of a representation (e.g., B+tree) of the file specified in the read request. In the event that the read contents comprise a static representation associated with a known data pattern, known data pattern engine 410 is configured to use the static representation to either reconstruct/generate the data block (that is associated with a predetermined data pattern) or retrieve from a location in persistent storage a copy of the data block (that is associated with a promoted data pattern), as will be described in further detail below.

In some embodiments, at least some of the functionalities of deduplication engine 408 and known data pattern engine 410 described above may be implemented by one or more processors (not shown) of the storage system.

Figure 5:
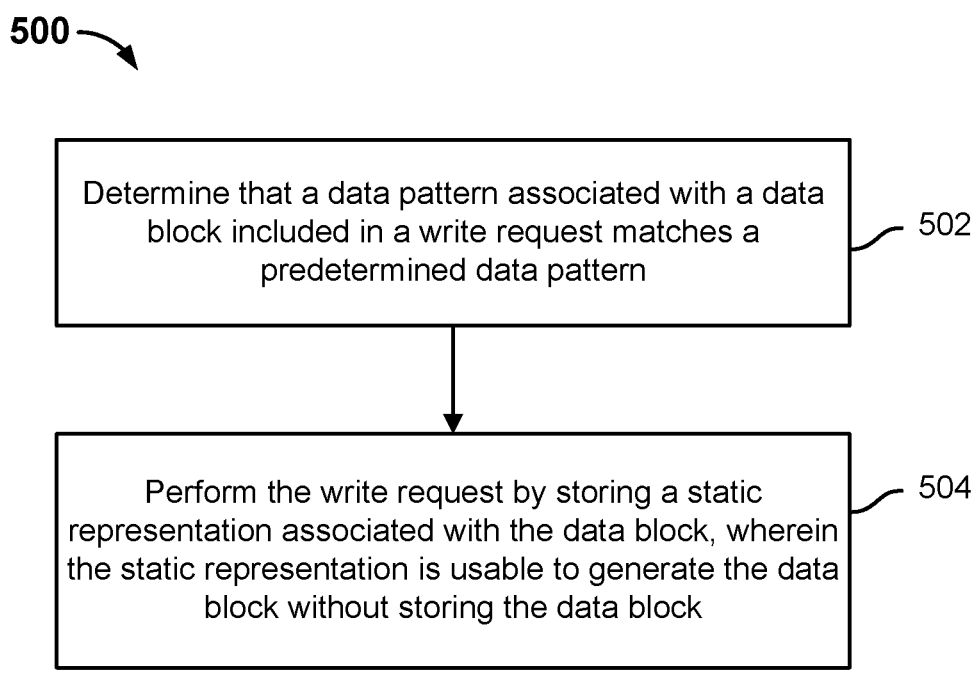
FIG. 5 is a flow diagram showing an embodiment of a process for deduplicating a data block for which an associated data pattern matches a predetermined data pattern.

FIG. 5 is a flow diagram showing an embodiment of a process for deduplicating a data block for which an associated data pattern matches a predetermined data pattern. In some embodiments, process 500 is implemented at storage system 400 of FIG. 4.

At 502, a data pattern associated with a data block included in a write request is determined to match a predetermined data pattern. A write request to write a data block to a file in a storage system is received. In various embodiments, a data pattern is derived from the data block by hashing at least a portion of the data block. For example, the data pattern is an SHA1 hash of the data block. In various embodiments, the determined data pattern of the data block is compared against the known data patterns included in a known data pattern data structure and it is determined that the determined data pattern matches a predetermined data pattern included in the known data pattern data structure. For example, the known data pattern data structure comprises a known data pattern table. In some embodiments, at least a portion of the known data pattern data structure is stored in memory.

At 504, the write request is performed by storing a static representation associated with the data block and not storing the data block, wherein the static representation is usable to generate the data block. As described above, a predetermined data pattern is a data pattern that is submitted by a user and is associated with a data block that may be easily reconstructed using a set of encoded data, where the encoded data is more lightweight and/or smaller in size than the data block itself. For example, a data block associated with a predetermined data pattern comprises a set of all zeroes or a set of all ones. In various embodiments, a set of encoded data that can be used to reconstruct a data block associated with a predetermined data pattern is used as the static representation (which is sometimes referred to as a "static pointer") corresponding to that data block. For example, a set encoded data associated with a data block associated with a predetermined data pattern may comprise a manually configured static string. Some specific examples of sets of encoded data include a static string of "ONE" for a data block comprising all ones and a static string of "ZERO" for a data block comprising all zeroes. As such, in various embodiments, the static representation (a set of encoded data) that is usable to reconstruct/generate the data block of the matching predetermined data pattern is stored in a portion/location/logical offset/leaf node of a representation of the file to which the data block is requested to be written. Because a data block associated with a predetermined data pattern can be reconstructed using the corresponding static representation, a copy of the data block is not stored at the storage system. Furthermore, in various embodiments, a reference count is not maintained for a data block associated with a predetermined data pattern.

Figure 6:
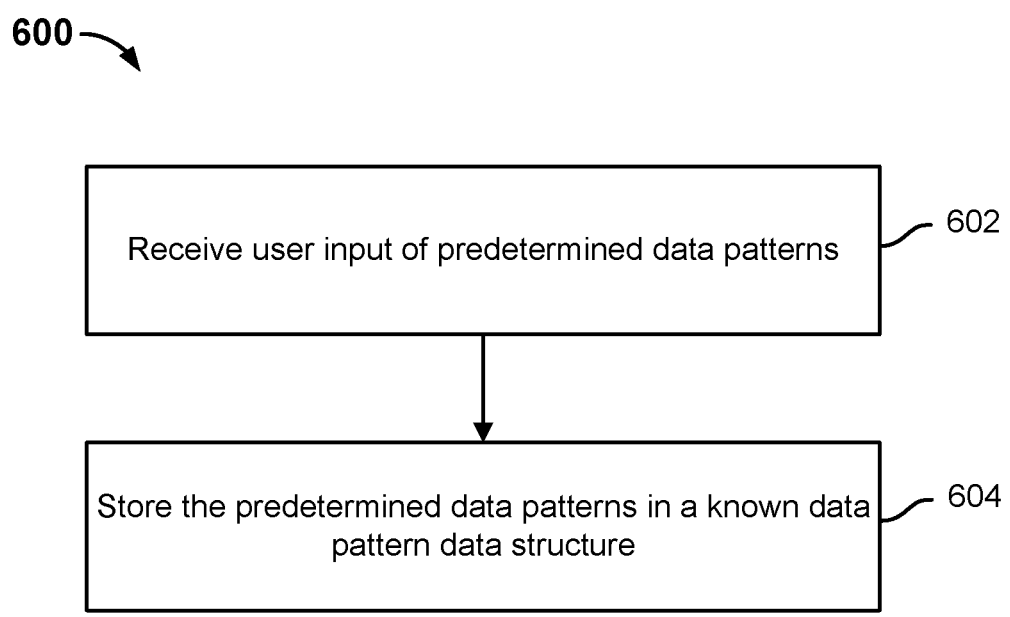
FIG. 6 is a flow diagram showing an example of a process of obtaining predetermined data patterns.

FIG. 6 is a flow diagram showing an example of a process of obtaining predetermined data patterns. In some embodiments, process 600 is implemented at storage system 400 of FIG. 4.

At 602, user input of predetermined data patterns is received. Predetermined data patterns are those that are associated with "special" data blocks that are identified as being reconstructable using a smaller set of data (encoded data). For example, a data block associated with a predetermined data pattern comprises a set of all zeroes or a set of all ones. The predetermined data patterns are hashes (e.g., SHA1) of identified special data blocks. The predetermined data patterns may be input into a storage system by one or more users.

At 604, the predetermined data patterns are stored in a known data pattern data structure. The predetermined data patterns are stored with other known data patterns, such as promoted data patterns, in the known data pattern data structure at the storage system. In some embodiments, the static representations (sets of encoded data) corresponding to the predetermined data patterns are stored with the predetermined data patterns in the known data pattern data structure. In some embodiments, the known data pattern data structure is at least partially stored in memory. As described above, a data pattern of a data block that is included in a write request is first compared against the known data patterns in the known data pattern data structure and only compared against the data patterns in the (presumably larger set of) conventional deduplication data entries if a matching known data pattern is not found.

Figure 7:
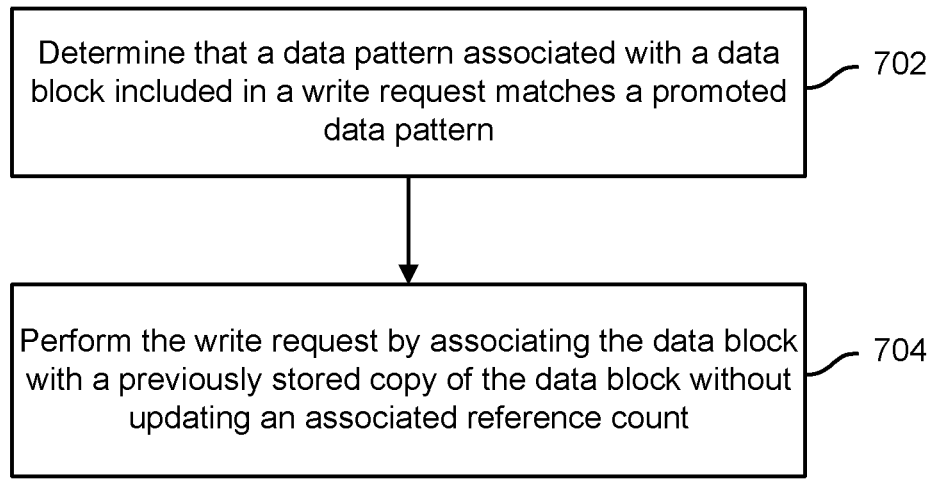
FIG. 7 is a flow diagram showing an embodiment of a process for deduplicating a data block for which an associated data pattern matches a promoted data pattern.

FIG. 7 is a flow diagram showing an embodiment of a process for deduplicating a data block for which an associated data pattern matches a promoted data pattern. In some embodiments, process 700 is implemented at storage system 400 of FIG. 4.

At 702, a data pattern associated with a data block included in a write request is determined to match a promoted data pattern. A write request to write a data block to a file in a storage system is received. In various embodiments, a data pattern is derived from the data block by hashing at least a portion of the data block. For example, the data pattern is an SHA1 hash of the data block. In various embodiments, the determined data pattern of the data block is compared against the known data patterns included in a known data pattern data structure and it is determined that the determined data pattern matches a promoted data pattern included in the known data pattern data structure. For example, the known data pattern data structure comprises a known data pattern table. In some embodiments, at least a portion of the known data pattern data structure is stored in memory.

At 704, the write request is performed by associating the data block with a previously stored copy of the data block without updating an associated reference count. As described above, a promoted data pattern is a data pattern that is not easily reconstructable using a set of encoded data that is more lightweight and/or smaller in size than the data block itself. In various embodiments, a promoted data pattern is a data pattern stored in the conventional deduplication data entries that is identified to be associated with a reference count that meets or exceeds a promotion threshold value (e.g., 25,000). In various embodiments, the promotion threshold value is configured to be a reference count value that is associated with popular or frequently accessed data patterns. In some embodiments, the promotion threshold value may be tunable to different values in different contexts. In various embodiments, a static representation (which is sometimes referred to as a "static pointer") corresponding to a promoted data pattern is usable to locate the physical address in persistent storage at which a previous copy of the data block is stored. Unlike a data block associated with a predetermined data pattern, an instance/copy of a data block associated with a promoted data pattern is to be stored at the persistent storage of the storage system. As such, in various embodiments, the static representation corresponding to a promoted data pattern is stored in a portion/location/logical offset/leaf node of a representation of the file to which the data block is requested to be written. Furthermore, in various embodiments, a reference count is no longer updated for a data block associated with a promoted data pattern. For example, if a data block was identified to be associated with a promoted data pattern when its reference count was 25,039, after the data pattern of the data block is identified to be a promoted data pattern, despite additional references being made to the data block, its reference count is no longer stored or at least no longer updated from 25,039.

In some embodiments, the static representation corresponding to a promoted data pattern comprises a reference (e.g., pointer) to an entry in an auxiliary data structure (e.g., table). In various embodiments, the auxiliary data structure stores corresponding relationships between static representations associated with promoted data patterns and physical addresses in persistent storage at which copies of data blocks corresponding to the promoted data patterns are stored. In some embodiments, an entry in an auxiliary data structure may store a corresponding relationship between a static representation associated with a promoted data pattern and a reference to an augmented block metadata record, which is a data structure that stores the physical address in persistent storage at which a copy of the data block associated with the promoted data pattern is stored. While the augmented block metadata record is similar to the block metadata record (e.g., an example of block metadata record is described in FIG. 2), the augmented block metadata record does not maintain a reference count and/or does not update a reference count associated with the data block in response to each additional reference that is written to the data block. In some embodiments, an entry in an auxiliary data structure may store a corresponding relationship between a static representation associated with a promoted data pattern and a reference to the physical address in persistent storage at which a copy of the data block associated with the promoted data pattern is stored (instead of a reference to the augmented block metadata record).

Figure 8:
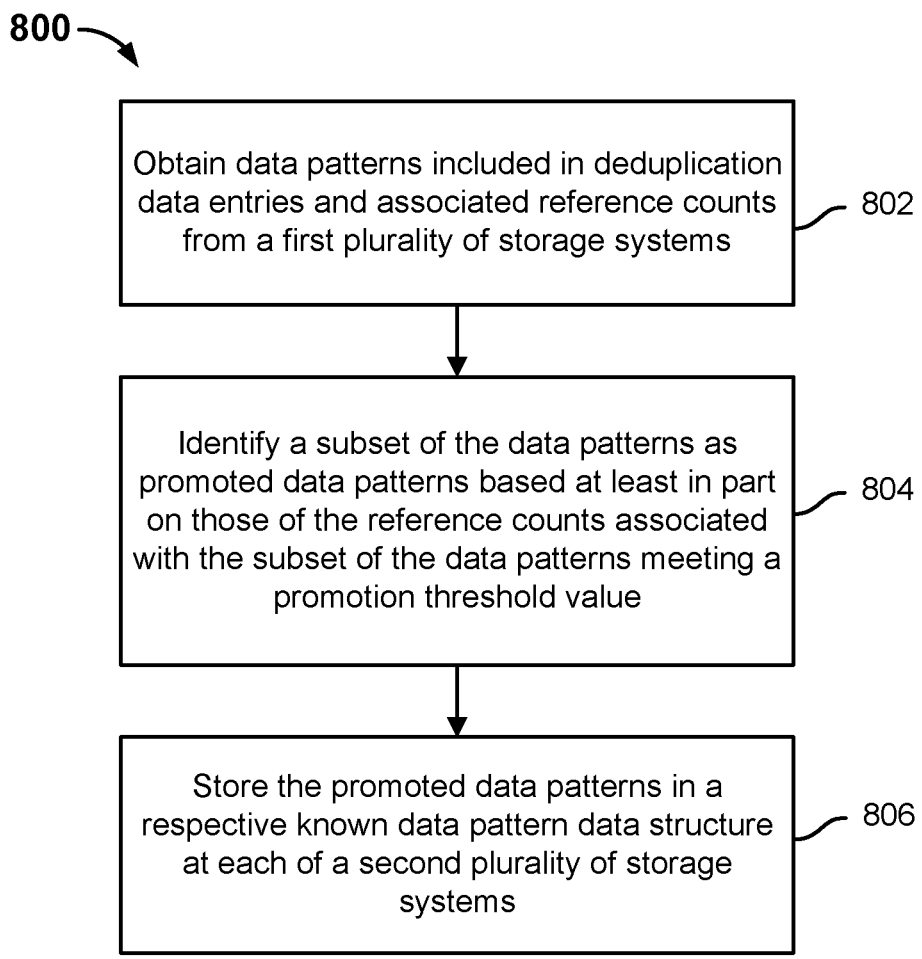
FIG. 8 is a flow diagram showing an embodiment of a process for identifying promoted data patterns obtained from a first plurality of storage systems and storing the promoted data patterns to a second plurality of storage systems.

FIG. 8 is a flow diagram showing an embodiment of a process for identifying promoted data patterns obtained from a first plurality of storage systems and storing the promoted data patterns to a second plurality of storage systems. In some embodiments, process 800 is implemented at storage system 400 of FIG. 4.

Process 800 describes an example process of identifying promoted data patterns among deduplication data entries that are maintained by a first plurality of storage systems, which are already in use at various customer sites for storing and obtaining data, and then loading the identified promoted data patterns into a second plurality of storage systems that have not been delivered to and/or used at customer sites. Process 800 may be referred as a static technique of identifying promoted data patterns because it does not continuously identify data patterns to designate as promoted data patterns.

At 802, data patterns included in deduplication data entries and associated reference counts are obtained from a first plurality of storage systems. The first plurality of storage systems may already be in use at one or more customer sites. During the course of storing data by the first plurality of storage systems, in the conventional manner, each of the first plurality of storage systems stored deduplication data entries with data patterns of data blocks that were stored and updated the reference count corresponding to each data pattern as additional writes of the same corresponding data blocks were performed. In various embodiments, the data patterns included in deduplication data entries and their associated reference counts are obtained from a first plurality of storage systems in an anonymized manner (such that proprietary information or sensitive information associated with the first plurality of storage systems is not obtained).

At 804, a subset of the data patterns is identified as promoted data patterns based at least in part on those of the reference counts associated with the subset of the data patterns meeting a promotion threshold value. The reference count associated with a data pattern that is stored by one or more storage systems of the first plurality of storage systems is compared to a promotion threshold value and if the reference count at least meets the promotion threshold value, then the data pattern is identified as a promoted (e.g., popular) data pattern. In various embodiments, the promotion threshold value may be changed in response to different scenarios at the storage system. For example, the promotion threshold value may be adjusted based on different sized workloads, different types of workloads, and different available capacities at a known data pattern data structure.

For example, the following information is collected for each data block whose reference count exceeds the promotion threshold value.

{
Fingerprint; //Uniquely identifies the data pattern.
RefCount; //Reference count at the time of logging.
}

In some embodiments, instead of using a promotion threshold value to identify promoted data patterns, one or more filter criteria are used to identify promoted data patterns obtained across the first plurality of storage systems. The following example filter may be applied to identify the most popular block(s) that are found across the first plurality of storage systems 1. Does the data block appear at 70% of the first plurality of storage systems?

2. Does the data block appear in more than the 90th percentile of the blocks on a particular storage system?

The filter described above is merely an example filter for identifying the most popular block(s) across the first plurality of storage systems and in practice, other filters may be used to identify the most popular block(s) as well.

At 806, the promoted data patterns are stored in a respective known data pattern data structure at each of a second plurality of storage systems. The promoted data patterns identified from the first plurality of storage systems that have been/are currently in use across one or more customer sites are stored in the respective known data pattern data structure at each of a second plurality of storage systems, which are storage systems that have yet to be used at one or more customer sites. As such, the second plurality of storage systems is pre-seeded with promoted data patterns that were identified to be popular at other storage systems that were already in use and can immediately benefit from the deduplication advantages provided by the pre-seeded promoted data patterns (without needing to store the same data patterns using the conventional deduplication process and over time, promoting them to being known data patterns when their reference counts meet the promotion threshold value). It should be noted that a storage system that stores a pre-seeded promoted data pattern may not already store a copy of the data block that corresponds to the pre-seeded promoted data pattern. As such, after the data block that corresponds to the pre-seeded promoted data pattern is requested to be written at the storage system for the first time, it will be determined that its data pattern matches the pre-seeded promoted data pattern and a copy of the data block is stored at the storage system. The physical address at which the copy of the data block is stored at the storage system is then included in an augmented block metadata record (which does not update a reference count of the data block), for which a reference is stored in a corresponding entry in the auxiliary data structure (e.g., table), or the physical address at which the copy of the data block is stored directly in the corresponding entry in the auxiliary table.

Figure 9:
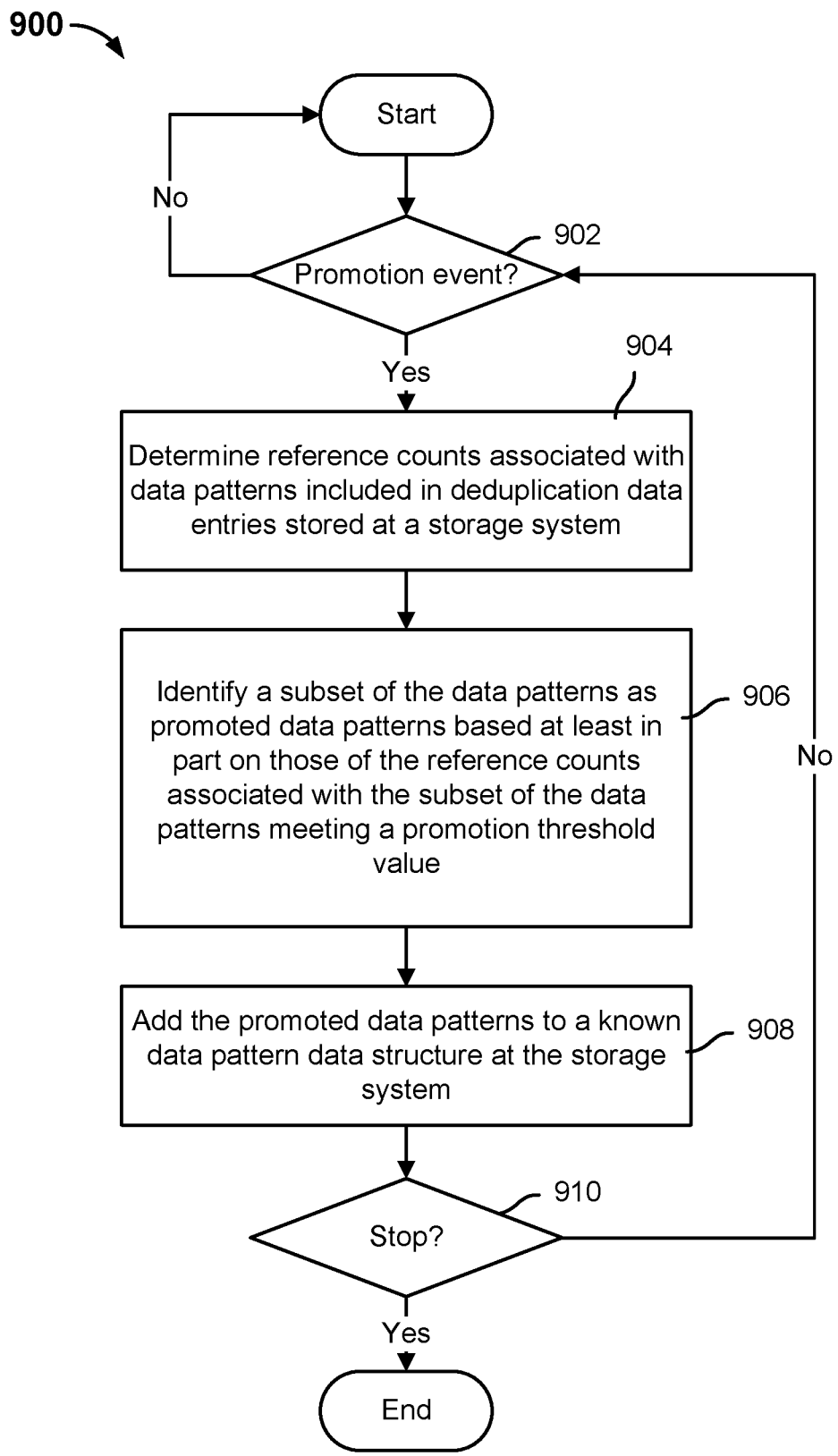
FIG. 9 is a flow diagram showing an embodiment of a process for continuously identifying promoted data patterns from deduplication data entries maintained at a storage system.

FIG. 9 is a flow diagram showing an embodiment of a process for continuously identifying promoted data patterns from deduplication data entries maintained at a storage system. In some embodiments, process 900 is implemented at storage system 400 of FIG. 4.

Process 900 describes an example process of continuously identifying promoted data patterns from deduplication data entries maintained at a single storage system (e.g., that is located at a single customer site). Because process 900 dynamically identifies promoted data patterns, process 900 may be thought of as an adaptive technique for promoted data pattern identification.

At 902, it is determined whether a promotion event has occurred. In the event that the promotion event has occurred, control is transferred to 904. Otherwise, in the event that the promotion event has not occurred, control waits until a promotion event occurs. In various embodiments, promoted data patterns are added into a known data pattern data structure in response to the occurrence of a promotion event. For example, a promotion event comprises the elapse of a predetermined period of time (e.g., every seven days).

At 904, reference counts associated with data patterns included in deduplication data entries stored at a storage system are determined. As the storage system is being used to store and obtain data at a customer site, data patterns are stored in deduplication data entries per the conventional process of deduplicating data blocks (e.g., as described by process 100 of FIG. 1). Furthermore, per the conventional process of deduplicating data blocks, reference counts are updated for data blocks and/or their associated data patterns in response to repeated references (e.g., pointers within files) being written to the data blocks in underlying storage. In response to the occurrence of a promotion event, the reference counts associated with the data patterns included in the stored deduplication data entries are obtained.

At 906, a subset of the data patterns is identified as promoted data patterns based at least in part on those of the reference counts associated with the subset of the data patterns meeting a promotion threshold value. Those data patterns whose associated reference counts meet or exceed a promotion threshold value (e.g., 25,000) are promoted and then designated as promoted data patterns.

Figure 10:
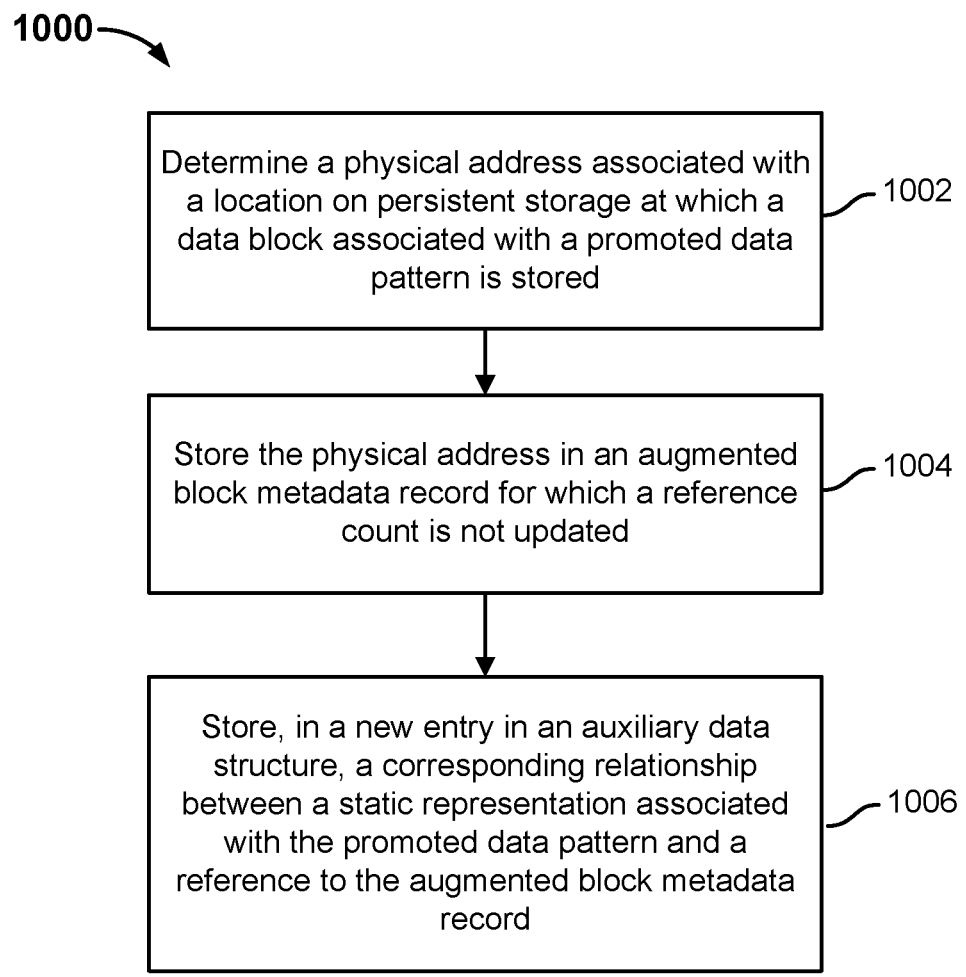
FIG. 10 is a flow diagram showing an example of a process for updating an auxiliary data structure with a new entry associated with a new promoted data pattern.

At 908, the promoted data patterns are added to a known data pattern data structure at the storage system. In some embodiments, in addition to the promoted data patterns, the static representations corresponding to the promoted data patterns are also added to the known data pattern data structure. As mentioned above, after a data pattern is designated as a promoted data pattern and added to the known data pattern data structure, a reference count is no longer maintained/updated for the promoted data pattern, even as additional writes of the data block associated with the promoted data patterns are processed at the storage system. In some embodiments, for a new promoted data pattern that is added to the known data pattern data structure, a new entry corresponding to the new promoted data pattern is also added to an auxiliary data structure. In some embodiments, the new entry in the auxiliary data structure associates a static representation associated with the new promoted data pattern with a physical address of a location in persistent storage at which the data block associated with the promoted data pattern is stored. FIG. 10 below describes an example process of adding a new entry corresponding to a new promoted data pattern in an auxiliary data structure.

At 910, it is determined whether to stop checking for promotion events. In the event that promotion events are no longer checked for, process 900 ends. Otherwise, in the event that promotion events are continued to be checked for, control returns to 902. For example, promotion events are no longer checked for if the storage system is powered off for whatever reason.

FIG. 10 is a flow diagram showing an example of a process for updating an auxiliary data structure with a new entry associated with a new promoted data pattern. In some embodiments, process 1000 is implemented at storage system 400 of FIG. 4. In some embodiments, step 908 of process 900 of FIG. 9 may be implemented at least in part by process 1000.

Process 1000 describes an example process of updating an auxiliary data structure with a new entry associated with a new promoted data pattern, including by associating a static representation associated with the promoted data pattern with an augmented block metadata record that stores the physical address of a location in persistent storage at which the data block associated with the promoted data pattern is stored.

At 1002, a physical address associated with a location on persistent storage at which a data block associated with a promoted data pattern is stored is determined. The physical address in persistent storage at which a data block associated with a promoted data pattern is stored may be determined, in some embodiments, from a block metadata record that is referenced by a deduplication data entry that had stored the promoted data pattern.

At 1004, the physical address is stored in an augmented block metadata record for which a reference count is not updated. The physical address is then stored in an augmented block metadata record, which unlike a regular block metadata record, stores the physical address at which a data block is stored but does not maintain an updated reference count associated with the number of times that the data block is referenced across files of the storage system.

At 1006, a corresponding relationship between a static representation associated with the promoted data pattern and a reference to the augmented block metadata record is stored in a new entry in an auxiliary data structure. A reference to the augmented block metadata record is stored in a new entry of the auxiliary data structure corresponding to the static representation corresponding to the promoted data pattern. In various embodiments, the static representation corresponding to the promoted data pattern is to be written to each appropriate portion/logical offset/leaf node of a file for which the data block associated with the promoted data pattern is requested to be written. In various embodiments, when the portion/logical offset/leaf node of the file is requested to be read, the static representation corresponding to the promoted data pattern is used to lookup in the auxiliary data structure the physical address of the stored copy of the data block in the storage system such that the data block can be read and returned to the requestor.

While process 1000 describes storing a new entry in an auxiliary data structure for a new promoted data pattern that associates a static representation associated with the promoted data pattern with an augmented block metadata record that stores the physical address of a location in persistent storage at which the data block associated with the promoted data pattern is stored, in another example, the augmented block metadata record is not used and a new entry in an auxiliary data structure is used for a new promoted data pattern that associates a static representation associated with the promoted data pattern directly with the physical address of a location in persistent storage at which the data block is stored. Regardless of whether a reference to an augmented block metadata record is used in the auxiliary data structure, in various embodiments, a reference count is not (no longer) maintained for a data block associated with a promoted data pattern.

FIG. 11 is a diagram showing an example of a known data pattern data structure. In the example, known data pattern data structure 1100 is a table that stores M predetermined data patterns and N promoted data patterns. As described above, in various embodiments, predetermined data patterns may be associated with one type of static representation and promoted data patterns may be associated with another, different type of static representations. Because the data blocks from which predetermined data patterns are derived are reconstructable, in various embodiments, the type of static representations that is associated with the data blocks from which predetermined data patterns are derived is usable to reconstruct such data blocks. Because the data blocks from which promoted data patterns are derived are not reconstructable, in various embodiments, the type of static representations that are associated with the data blocks from which promoted data patterns are derived refers to entries in an auxiliary data structure (FIG. 12, below, shows an example auxiliary data structure) and where each entry in the auxiliary data structure references, either directly or indirectly via an augmented block metadata record, the physical address of a location in persistent storage at which a copy of a data block is stored. As such, in the example of known data pattern data structure 1100, each predetermined data pattern is stored with a corresponding first type of static representation and each promoted data pattern is stored with a corresponding second type of static representation, where the first and the second types of static representations may be different. In some embodiments, at least a portion of known data pattern data structure 1100 is stored in memory, which provides faster accesses than persistent storage.

Figure 13:
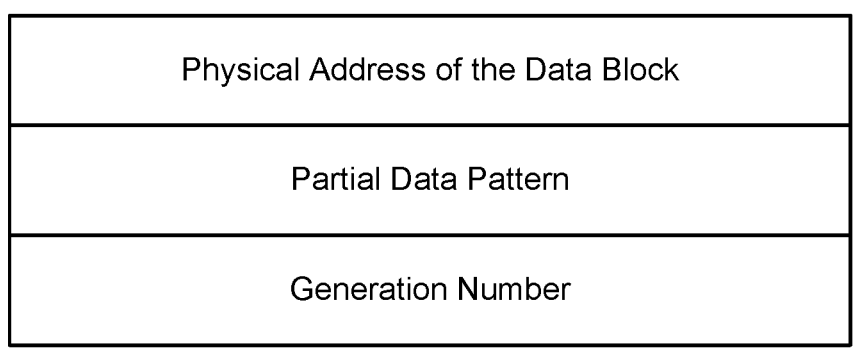
FIG. 13 is a diagram showing an example of an augmented block metadata record.

FIG. 12 is a diagram showing an example of an auxiliary data structure. In the example, auxiliary data structure 1200 is a table that stores entries comprising corresponding relationships between static representations associated with promoted data patterns and augmented block metadata record indices. An augmented block metadata record index comprises a reference (e.g., pointer) to an augmented block metadata record, which stores the physical address of a location in persistent storage at which the data block associated with the promoted data pattern is stored. FIG. 13, below, shows an example augmented block metadata record. In the event that a data block of a write request matches a promoted data pattern, the static representation associated with the matching promoted data pattern is written to the specified logical offset/portion/leaf node of a file. When that logical offset/portion/leaf node of the file is subsequently requested to be read, the static representation associated with the promoted data pattern is looked up in an auxiliary data structure such as auxiliary data structure 1200 and the corresponding augmented block metadata record index is identified to locate the augmented block metadata record that stores the physical address of a copy of the data block associated with the promoted data pattern. Once the physical address of a copy of the data block associated with the promoted data pattern is determined, the data block can be read from its storage location.

While auxiliary data structure 1200 stores augmented block metadata record indices corresponding to static representations associated with promoted data patterns in entries, in some other embodiments, an auxiliary data structure may directly store the physical addresses of data blocks corresponding to static representations associated with promoted data patterns in entries.

FIG. 13 is a diagram showing an example of an augmented block metadata record. In the example, augmented block metadata record 1300 is similar to a block metadata record (an example of which is shown in FIG. 2) except that augmented block metadata record 1300 does not include a reference count. In another example, the augmented block metadata record 1300 may include a reference count (e.g., the reference count of the data block at the time that the data pattern was identified to be designated as a promoted data pattern) but one that is not updated. In the example, besides not storing a "Reference Count" field, augmented block metadata record 1300 is similar to a block metadata record and also includes the fields of "Physical Address of the Data Block," "Partial Data Pattern," and "Generation Number." The "Physical Address of the Data Block" field may store a value that represents the physical address of the location at which a data block is stored at the underlying storage. The "Partial Data Pattern" field may store a portion of the data pattern of the data block. The "Generation Number" field may store the current generation of the augmented block metadata record.

Figure 14:
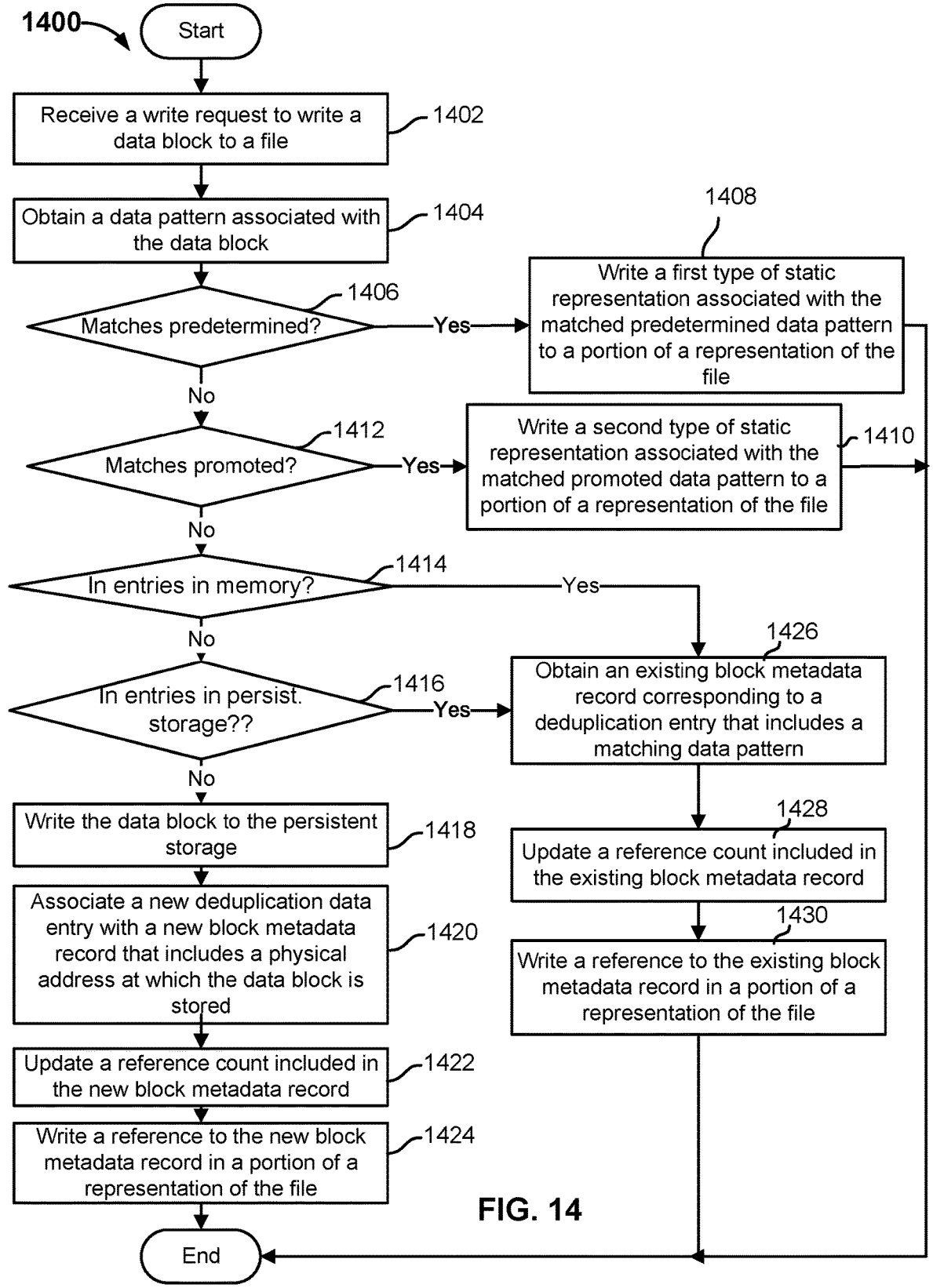
FIG. 14 is a flow diagram showing an embodiment of a process for processing a write request using a known data pattern data structure.

FIG. 14 is a flow diagram showing an embodiment of a process for processing a write request using a known data pattern data structure. In some embodiments, process 1400 is implemented at storage system 400 of FIG. 4.

Process 1400 describes an example of processing a write request using a known data pattern data structure and how the write request is handled in the event that the data pattern associated with the data block associated with the write request is not found in the known data pattern data structure.

At 1402, a write request to write a data block to a file is received. In various embodiments, a write request comprises a file identifier (e.g., fileID), an offset, and a size of a data block.

At 1404, a data pattern associated with the data block is obtained. For example, the data pattern is determined as a hash value (e.g., SHA1) of at least a portion of the data block.

At 1406, it is determined whether the data pattern matches a predetermined data pattern that is included in a known data pattern data structure. In the event that the data pattern matches a predetermined data pattern that is included in a known data pattern data structure, control is transferred to 1408. Otherwise, in the event that the data pattern does not match a predetermined data pattern that is included in a known data pattern data structure, control is transferred to 1412. The data pattern is compared to known data patterns, including both predetermined data pattern(s) and promoted data pattern(s), which are stored in the known data pattern data structure. It is determined whether the data pattern associated with the data block matches a predetermined data pattern, which is associated with a reconstructable data block.

At 1408, a first type of static representation associated with the matched predetermined data pattern is written to a portion of a representation of the file. As described above, because a predetermined data pattern is associated with a reconstructable data block, in various embodiments, a static representation associated with a predetermined data pattern comprises a first type of a static representation such as, for example, a set of encoded data that is usable to reconstruct the data block. The static representation associated with the matching predetermined data pattern is therefore written to the appropriate portion/logical offset/leaf node of a representation (e.g., B+tree) of the file specified in the write request. Furthermore, the data block that matches the predetermined data pattern is not stored (nor ever has been stored) in the storage system (because it can be easily reconstructed), which saves on storage space. Moreover, no reference count is updated for the matching predetermined data pattern or the corresponding data block. When this static representation is read from the portion/logical offset/leaf node of the file's B+tree, the data block is reconstructed/generated using the static representation.

At 1412, it is determined whether the data pattern matches a promoted data pattern that is included in the known data pattern data structure. In the event that the data pattern matches a promoted data pattern that is included in a known data pattern data structure, control is transferred to 1410. Otherwise, in the event that the data pattern does not match a promoted data pattern that is included in a known data pattern data structure, control is transferred to 1414. It is determined whether the data pattern associated with the data block matches a promoted data pattern, which is associated with a non-reconstructable data block.

In various embodiments, either step 1406 or step 1412 could be performed first or the two steps could be performed at least partially concurrently (e.g., the data pattern associated with the data block is compared against different known data patterns, regardless if they are predetermined or promoted data patterns).

At 1410, a second type of static representation associated with the matched promoted data pattern is written to a portion of a representation of the file. As described above, because a promoted data pattern is associated with a non-reconstructable data block, in various embodiments, a static representation associated with a promoted data pattern comprises a second type of a static representation such as, for example, content that is usable to lookup an entry in an auxiliary data structure that stores corresponding relationships between static representations associated with promoted data patterns and physical addresses at which data blocks corresponding to the promoted data patterns are stored in persistent storage. The static representation associated with the matching promoted data pattern is therefore written to the appropriate portion/logical offset/leaf node of a representation (e.g., B+tree) of the file specified in the write request. Furthermore, the data block that matches the promoted data pattern is not stored again in the storage system because a copy of the data block has already been previously stored in the storage system. Moreover, no reference count is updated for the matching promoted data pattern or the corresponding data block. When this static representation is read from the portion/logical offset/leaf node of the file's B+tree, a stored copy of the data block is retrieved from persistent storage using the static representation.

If no matching known data pattern is found for the data pattern associated with the data block of the write request, the data pattern is checked against the data patterns that are stored in the conventional deduplication data entries in a process similar to process 100 of FIG. 1, as described below for steps 1414 through 1430.

At 1414, it is determined whether the data pattern is found in a first set of deduplication data entries stored in memory. In the event that the data pattern is found in the first set of deduplication data entries stored in memory, control is transferred to 1426. Otherwise, in the event that the data pattern is not found in the first set of deduplication data entries stored in memory, control is transferred to 1416.

At 1416, it is determined whether the data pattern is found in a second set of deduplication data entries stored in persistent storage. In the event that the data pattern is found in the second set of deduplication data entries stored in persistent storage, control is transferred to 1426. Otherwise, in the event that the data pattern is not found in the first set of deduplication data entries stored in memory, control is transferred to 1418.

At 1418, the data block is written to the persistent storage. Step 1418 may be performed similarly to step 110 of process 100 of FIG. 1.

At 1420, a new deduplication data entry is associated with a new block metadata record that includes a physical address at which the data block is stored. Step 1420 may be performed similarly to step 112 of process 100 of FIG. 1.

At 1422, a reference count included in the new block metadata record is updated. Step 1422 may be performed similarly to step 114 of process 100 of FIG. 1.

At 1424, a reference to the new block metadata record is written in a portion of a representation of a file. Step 1424 may be performed similarly to step 116 of process 100 of FIG. 1.

At 1426, an existing block metadata record corresponding to a deduplication data entry that includes a matching data pattern is obtained. Step 1426 may be performed similarly to step 118 of process 100 of FIG. 1.

At 1428, a reference count included in the existing block metadata record is updated. Step 1428 may be performed similarly to step 120 of process 100 of FIG. 1.

At 1430, a reference to the existing block metadata record is written in a portion of a representation of the file. Step 1430 may be performed similarly to step 122 of process 100 of FIG. 1.

Figure 15:
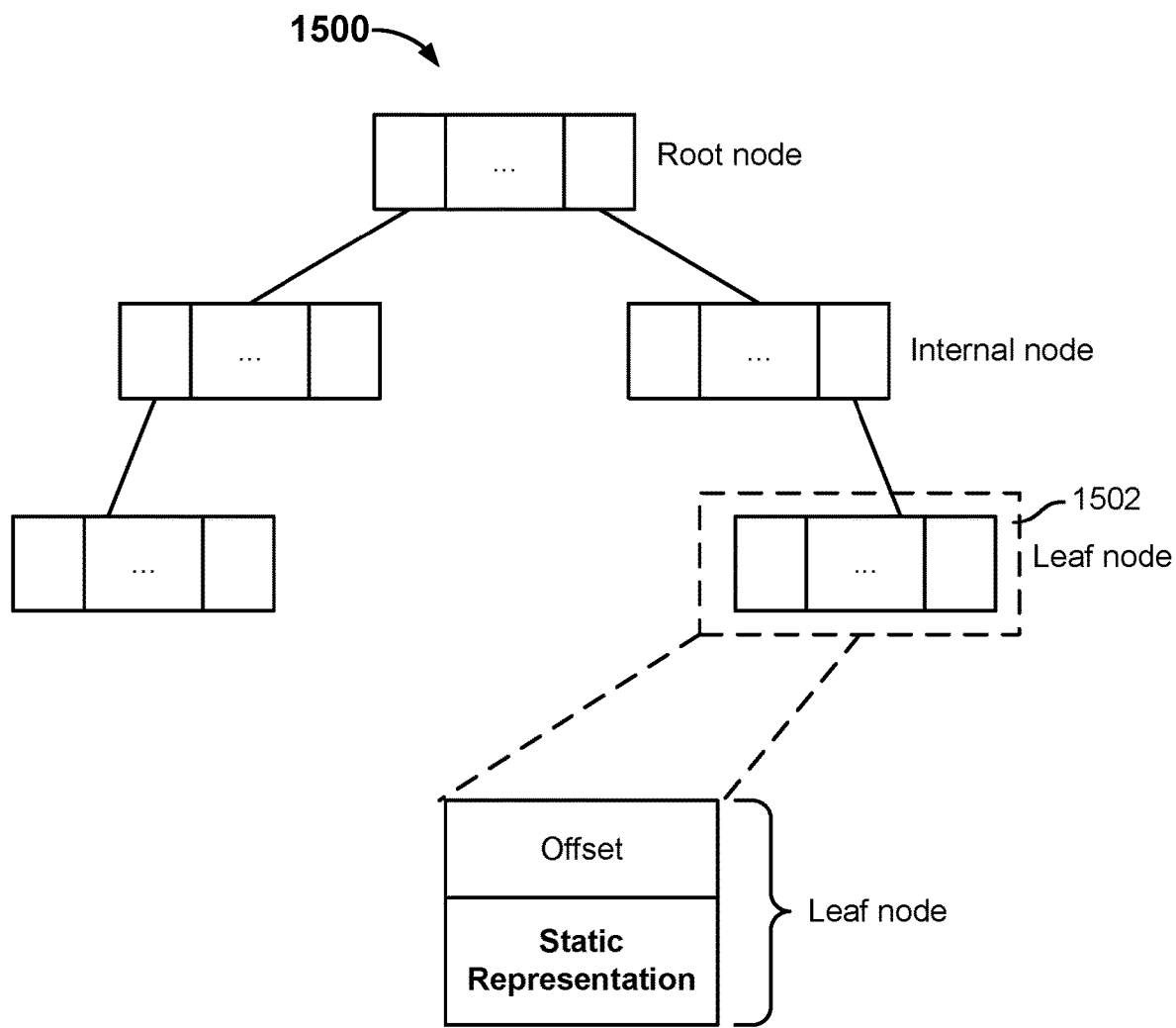
FIG. 15 is a diagram showing an example of a representation of a file that includes a static representation associated with a known data pattern.

FIG. 15 is a diagram showing an example of a representation of a file that includes a static representation associated with a known data pattern. In the example of FIG. 15, file 1500 is represented as a hierarchy/tree (e.g., a B+tree) of nodes. The top node of the hierarchy is referred to as the "root node" and the nodes at the bottom of the hierarchy are referred to as "leaf nodes." Intermediate nodes in between the root node and the leaf nodes are referred to as "internal nodes." In accordance to various embodiments, a leaf node, such as leaf node 1502 to which a data block that matches a known data pattern is written, comprises at least a logical "offset" field associated with the file and a "static representation" field. The "static representation" field stores a static representation associated with the matching known data pattern. If the matching known data pattern were a predetermined data pattern, then the stored static representation is of one type (e.g., a set of encoded data that is usable to reconstruct a data block). If the matching known data pattern were a promoted data pattern, then the stored static representation is of another type (e.g., a reference to an entry in an auxiliary data structure and the entry stores information usable to locate a location at which a copy of a data block is stored in underlying storage). While not shown in the example of FIG. 15, file 1500 may also include one or more other leaf nodes that store logical "offset" fields and corresponding "static representation" fields for data blocks that are written to file 1500 and that match known data patterns. Also, while not shown in the example of FIG. 15, file 1500 may also include one or more leaf nodes that store logical "offset" fields and corresponding "block metadata index" fields for data blocks that are written to file 1500 but that do not match known data patterns.

Figure 16:
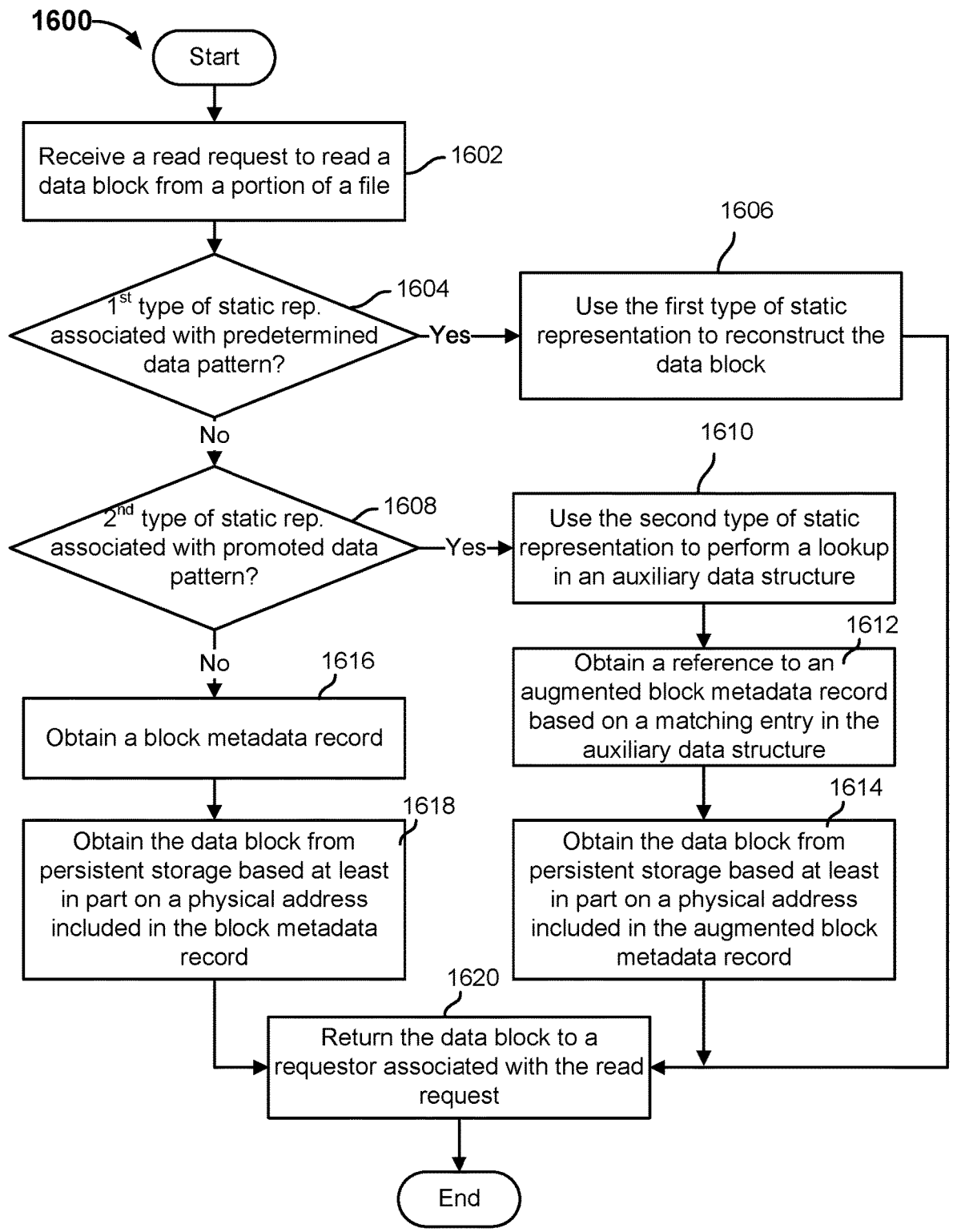
FIG. 16 is a flow diagram showing an embodiment of a process for processing a read request to a portion of a file.

FIG. 16 is a flow diagram showing an embodiment of a process for processing a read request to a portion of a file. In some embodiments, process 1600 is implemented at storage system 400 of FIG. 4.

Process 1600 describes an example of processing a read request to a portion of a file and how to obtain a requested data block for the requestor.

At 1602, a read request to read a data block from a portion of a file is received. The read request includes a logical offset associated with the specified file. The content that is stored at the logical offset of the file is read. In various embodiments, if the file were represented by a tree data structure (e.g., example tree representations of files are shown in FIG. 3 and FIG. 15), a leaf node corresponding to the specified logical offset is read.

At 1604, it is determined whether the portion of the file stores a first type of static representation associated with a predetermined data pattern. In the event that the portion of the file stores a first type of static representation associated with a predetermined data pattern, control is transferred to 1606. Otherwise, in the event that the portion of the file does not store a first type of static representation associated with a predetermined data pattern, control is transferred to 1608. If the logical offset (e.g., leaf node) stores a static representation, one or more attributes associated with the static representation are analyzed to determine whether it is associated with a predetermined data pattern or a promoted data pattern. As such, in various embodiments, steps 1604 and 1608 may be performed partially concurrently.

At 1606, the first type of static representation is used to reconstruct the data block. If the static representation were determined to be associated with the type associated with a predetermined data pattern, then it is used to reconstruct the requested data block and the physical storage is not accessed (because a copy of such a data block is not stored).

At 1608, it is determined whether the portion of the file stores a second type of static representation associated with a promoted data pattern. In the event that the portion of the file stores a second type of static representation associated with a promoted data pattern, control is transferred to 1610. Otherwise, in the event that the portion of the file does not store a second type of static representation associated with a promoted data pattern, control is transferred to 1616.

At 1610, the second type of static representation is used to perform a lookup in an auxiliary data structure. If the static representation were determined to be associated with the type associated with a promoted data pattern, then it is used to locate a matching entry (an entry that includes the static representation used to perform the lookup) in an auxiliary data structure.

At 1612, a reference to an augmented block metadata record is obtained based on a matching entry in the auxiliary data structure. In the example of FIG. 16, the auxiliary data structure stores corresponding relationships between static representations associated with promoted data patterns and references to augmented block metadata records, which in turn stores the physical addresses in persistent storage at which data blocks are stored. In another example, the auxiliary data structure stores corresponding relationships between static representations associated with promoted data patterns and physical addresses in persistent storage at which data blocks are stored.

At 1614, the data block is obtained from persistent storage based at least in part on a physical address included in the augmented block metadata record.

At 1616, a block metadata record is obtained. If the logical offset (e.g., leaf node) does not store a static representation and instead stores a reference to a block metadata record (e.g., leaf node 302 of FIG. 3), then the block metadata record is located.

At 1618, the data block is obtained from persistent storage based at least in part on a physical address included in the block metadata record. The block metadata record stores the physical address in persistent storage at which the data block is stored.

At 1620, the data block is returned to a requestor associated with the read request.

In some embodiments, once a data pattern is included in a known data pattern data structure, the data pattern is not removed from the known data pattern data structure. Because the size of the known data pattern data structure is relatively small (e.g., as compared to the overall size of the deduplication data entries that are maintained by the conventional deduplication process), the overhead of maintaining known data patterns is low. In some embodiments, a data pattern that is included in a known data pattern data structure is aged out of the known data pattern data structure after a predetermined period of time.

Figure 17:
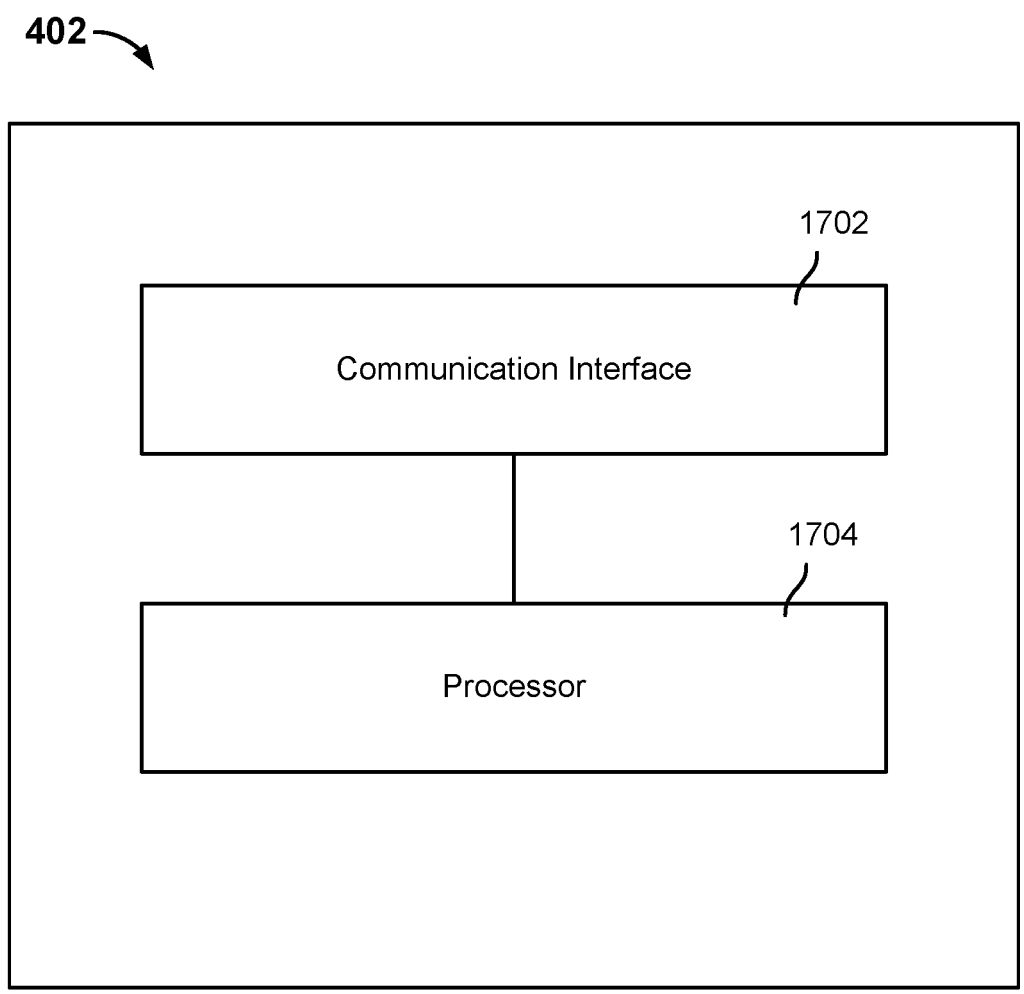
FIG. 17 is a block diagram illustrating an example of a storage system in accordance with some embodiments.

FIG. 17 is a block diagram illustrating an example of a storage system in accordance with some embodiments. In some embodiments, storage system 402 of FIG. 4 may be implemented using the example storage system of FIG. 17. In FIG. 17, the example storage system includes communication interface 1702 and processor 1704. Communication interface 1702 may be a network interface card or other interface that is configured to enable the storage system to be connected to and communicate via a network. Processor 1704 is configured to manage and use a set of known data patterns. In some embodiments, processor 1704 is configured to determine that a data pattern associated with a data block included in a write request matches a promoted data pattern and perform the write request by associating the data block with a previously stored copy of the data block without updating an associated reference count. In some embodiments, processor 1704 is configured to determine that a data pattern associated with a data block included in a write request matches a predetermined data pattern and perform the write request by storing a static representation associated with the data block and not storing the data block, wherein the static representation is usable to generate the data block.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
determine that a reference count associated with a data pattern meets a promotion threshold value, wherein the reference count associated with the data pattern comprises a number of times that a data block associated with the data pattern is associated with one or more files;
in response to the determination that the reference count associated with the data pattern meets the promotion threshold value, promote the data pattern to a promoted data pattern, wherein the promoted data pattern is configured to be compared against data patterns of new data blocks to perform deduplication;
receive a new write request to write the data block to a file;
determine that the data pattern associated with the data block matches the promoted data pattern; and
perform the new write request by associating the file with a previously stored copy of the data block without updating the reference count associated with the data pattern; and
a memory coupled to the processor and configured to store the new write request itself.

2. The system of claim 1, wherein the processor is further configured to:
receive a set of promoted data patterns, wherein:
data patterns included in deduplication data entries and associated reference counts are obtained from a plurality of storage systems; and
a subset of the data patterns are identified as the set of promoted data patterns based at least in part on those of the reference counts associated with the subset of the data patterns meeting the promotion threshold value.

3. The system of claim 1, wherein the processor is further configured to:
receive an indication that a promotion event has occurred;
determine reference counts associated with data patterns included in deduplication data entries stored at the system;
identify a subset of the data patterns included in the deduplication data entries as promoted data patterns at least in part on those of the reference counts associated with the subset of the data patterns meeting the promotion threshold value; and
add the promoted data patterns into a known data pattern data structure.

4. The system of claim 3, wherein the promotion threshold value is adjustable in response to at least one of: a current workload associated with the system and a remaining capacity at the known data pattern data structure.

5. The system of claim 1, wherein the processor is further configured to:
determine a physical address associated with a location on persistent storage at which the previously stored copy of the data block associated with the promoted data pattern is stored;
store the physical address in an augmented block metadata record, wherein the augmented block metadata record comprises a data structure that stores the physical address associated with the location on the persistent storage at which the previously stored copy of the data block associated with the promoted data pattern is stored, wherein the augmented block metadata record does not store the reference count associated with the promoted data pattern; and
store, in a new entry in an auxiliary data structure, a corresponding relationship between a static representation associated with the promoted data pattern and a reference to the augmented block metadata record.

6. The system of claim 1, wherein to perform the new write request by associating the file with the previously stored copy of the data block without updating the reference count comprises to store a static representation associated with the data block to a portion associated with the file that is specified by the new write request, wherein the static representation is usable to locate the previously stored copy of the data block.

7. The system of claim 6, wherein the processor is further configured to:
receive a read request to the portion associated with the file;
read, from the portion associated with the file, the static representation associated with the data block;
use the static representation to perform a lookup in an auxiliary data structure;
obtain a reference to an augmented block metadata record based at least in part on a matching entry in the auxiliary data structure; and
obtain the data block from storage based at least in part on a physical address at which the previously stored copy of the data block was stored included in the augmented block metadata record.

8. The system of claim 6, wherein the processor is further configured to:
receive a read request to the portion associated with the file;
read, from the portion associated with the file, the static representation associated with the data block;
use the static representation to perform a lookup in an auxiliary data structure; and
obtain the data block from storage based at least in part on a physical address at which the previously stored copy of the data block was stored from a matching entry in the auxiliary data structure.

9. A method, comprising:
determining that a reference count associated with a data pattern meets a promotion threshold value, wherein the reference count associated with the data pattern comprises a number of times that a data block associated with the data pattern is associated with one or more files;
in response to the determination that the reference count associated with the data pattern meets the promotion threshold value, promoting the data pattern to a promoted data pattern, wherein the promoted data pattern is configured to be compared against data patterns of new data blocks to perform deduplication;

receiving a new write request to write the data block to a file;

determining that the data pattern associated with the data block matches the promoted data pattern; and performing the new write request by associating the file with a previously stored copy of the data block without updating the reference count associated with the data pattern.

10. The method of claim 9, further comprising:

receiving an indication that a promotion event has occurred;

determining reference counts associated with data patterns included in deduplication data entries stored at a system;

identifying a subset of the data patterns included in the deduplication data entries as promoted data patterns at least in part on those of the reference counts associated with the subset of the data patterns meeting the promotion threshold value; and adding the promoted data patterns into a known data pattern data structure.

11. The method of claim 9, further comprising:

determining a physical address associated with a location on persistent storage at which the previously stored copy of the data block associated with the promoted data pattern is stored; and storing the physical address in an augmented block metadata record, wherein the augmented block metadata record comprises a data structure that stores the physical address associated with the location on the persistent storage at which the previously stored copy of the data block associated with the promoted data pattern is stored, wherein the augmented block metadata record does not store the reference count associated with the promoted data pattern.

12. The method of claim 9, further comprising:

receiving a set of promoted data patterns, wherein:

data patterns included in deduplication data entries and associated reference counts are obtained from a plurality of storage systems; and a subset of the data patterns are identified as the set of promoted data patterns based at least in part on those of the reference counts associated with the subset of the data patterns meeting the promotion threshold value.

13. The method of claim 10, wherein the promotion threshold value is adjustable in response to at least one of: a current workload associated with the system and a remaining capacity at the known data pattern data structure.

14. The method of claim 9, wherein performing the new write request by associating the file with the previously stored copy of the data block without updating the reference count comprises storing a static representation associated with the data block to a portion associated with the file that is specified by the new write request, wherein the static representation is usable to locate the previously stored copy of the data block.

15. The method of claim 14, further comprising:

receiving a read request to the portion associated with the file;

reading, from the portion associated with the file, the static representation associated with the data block;

using the static representation to perform a lookup in an auxiliary data structure;

obtaining a reference to an augmented block metadata record based at least in part on a matching entry in the auxiliary data structure; and obtaining the data block from storage based at least in part on a physical address at which the previously stored copy of the data block was stored included in the augmented block metadata record.

16. The method of claim 14, further comprising:

receiving a read request to the portion associated with the file;

reading, from the portion associated with the file, the static representation associated with the data block;

using the static representation to perform a lookup in an auxiliary data structure; and obtaining the data block from storage based at least in part on a physical address at which the previously stored copy of the data block was stored from a matching entry in the auxiliary data structure.

* * * * *